United States Patent [19]

Dennis

[11] 4,130,885
[45] Dec. 19, 1978

[54] PACKET MEMORY SYSTEM FOR PROCESSING MANY INDEPENDENT MEMORY TRANSACTIONS CONCURRENTLY

[75] Inventor: Jack B. Dennis, Belmont, Mass.

[73] Assignee: Massachusetts Institute of Technology, Cambridge, Mass.

[21] Appl. No.: 715,723

[22] Filed: Aug. 19, 1976

[51] Int. Cl.² .................... G06F 3/00; G06F 13/00; G06K 17/00
[52] U.S. Cl. ........................ 364/900; 179/15 BA
[58] Field of Search .................... 364/900, 200; 179/15 BA, 15 BV, 15 AQ, 15 AT, 15 AL, 18 ES

[56] References Cited

U.S. PATENT DOCUMENTS

| | | | |
|---|---|---|---|
| 3,594,730 | 7/1971 | Toy | 364/900 |
| 3,657,736 | 4/1972 | Boom et al. | 364/200 |
| 3,732,548 | 5/1973 | Howells et al. | 364/200 |
| 3,749,845 | 7/1973 | Fraser | 364/200 |
| 3,760,371 | 9/1973 | Pitroda et al. | 340/146.1 X |
| 3,766,534 | 10/1973 | Beausoleil et al. | 364/900 |
| 3,771,141 | 11/1973 | Culler | 364/900 |
| 3,810,100 | 5/1974 | Hungerford et al. | 364/200 |
| 3,962,706 | 6/1976 | Dennis et al. | 364/900 |
| 3,979,733 | 9/1976 | Fraser | 364/900 |
| 3,988,545 | 10/1976 | Kuemmerle | 179/15 BV |
| 3,996,559 | 12/1976 | Morrin et al. | 364/900 |
| 4,032,899 | 6/1977 | Jenny et al. | 364/200 |
| 4,058,672 | 11/1977 | Crager et al. | 178/3 |
| 4,071,706 | 1/1978 | Warren | 179/15 AL |
| 4,074,232 | 2/1978 | Otomo et al. | 179/15 BA |

Primary Examiner—Gareth D. Shaw
Assistant Examiner—Jan E. Rhoads
Attorney, Agent, or Firm—Arthur A. Smith, Jr.; Gerald Altman

[57] ABSTRACT

Packet communication is used in the architecture of a memory system capable of processing many independent memory transactions concurrently. The behavior of this memory system is prescribed by a formal memory model appropriate to a computer system for data flow programs.

9 Claims, 8 Drawing Figures

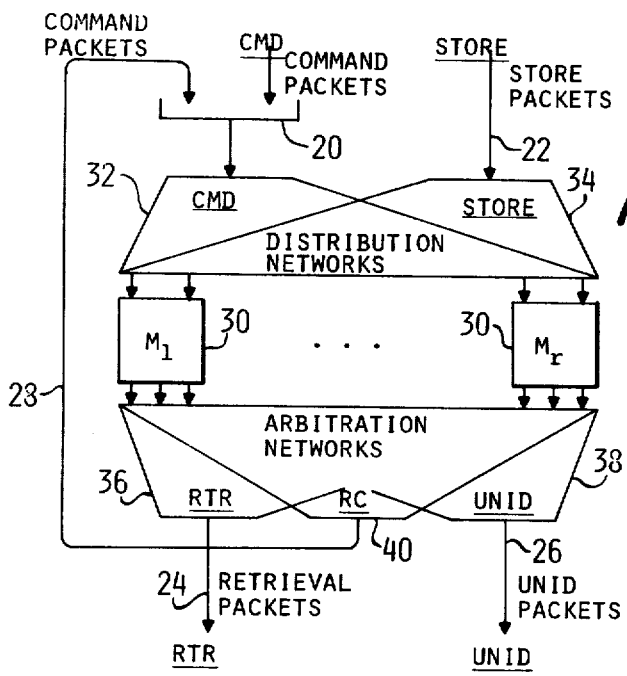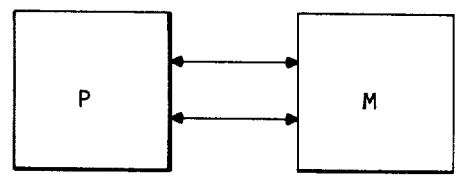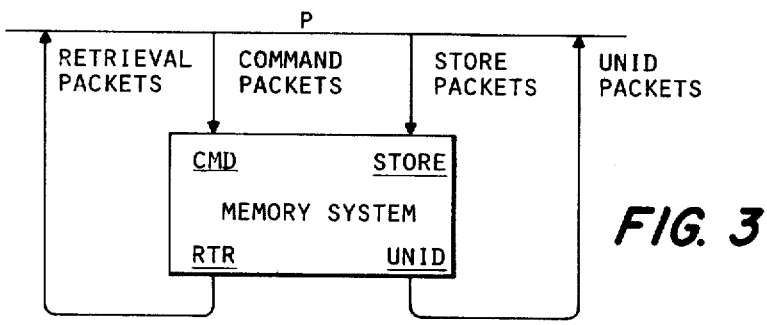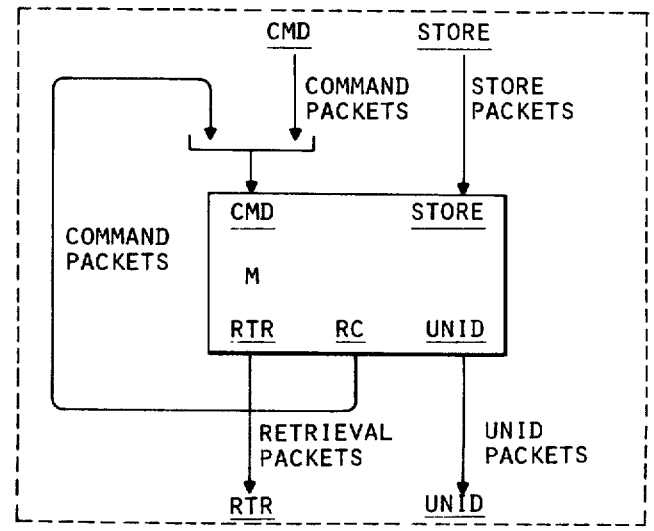

FIG. 5 STORE TRANSACTION:
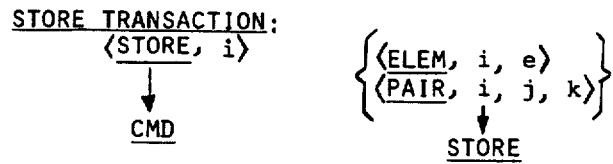
FIG. 6 RETRIEVAL TRANSACTION:
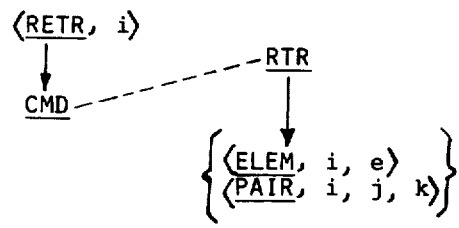
FIG. 7 REFERENCE GENERATION AND ANTIHALATION
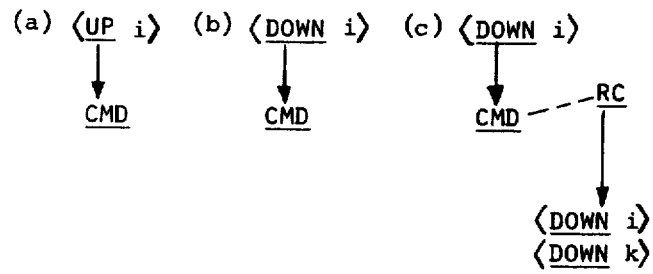
FIG. 8 UNIQUE IDENTIFIER GENERATION
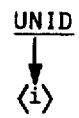

PACKET MEMORY SYSTEM FOR PROCESSING MANY INDEPENDENT MEMORY TRANSACTIONS CONCURRENTLY

The Government has rights to this invention pursuant to Grant No. NSF-76-58-GI-34761 and Institutional Patent Agreement No. 0100 awarded by the National Science Foundation.

RELATED APPLICATIONS AND INFORMATION

The present application is related to application Ser. No. 605,932, filed Aug. 19, 1975 in the names of Jack B. Dennis and David P. Misunas for Data Processing Apparatus For Highly Parallel Execution Of Stored Programs, which is a continuation-in-part of application Ser. No. 456,488, filed Mar. 29, 1974, now U.S. Pat. No. 3,962,706, issued June 8, 1976, in the names of Jack B. Dennis and David P. Misunas for Data Processing Apparatus For Highly Parallel Execution Of Stored Programs.

BACKGROUND OF THE INVENTION

1. Field of the Invention

Packet communication architecture is the structuring of data processing systems as collections of physical units that communicate only by sending information packets of fixed size, using an asynchronous protocol. Each unit is designed so it never has to wait for a response to a packet it has transmitted to another unit while other packets are waiting for its attention. Packets are routed between sections of a system by networks of units arranged to sort many packets concurrently according to their destination. In this way, it is possible to arrange that system units are heavily used, provided concurrency in the task to be performed can be exploited. The packet communication principle is especially attractive for data flow processors since the execution of data flow programs readily separates into many independent computational events. The present invention relates to the use of packet communication in the architecture of memory systems capable of processing many independent memory transactions concurrently. The behavior of these memory systems is prescribed by a formal memory model appropriate to a computer system for data flow programs.

2. The Prior Art

With the advent of large scale integration (LSI) technology, one of the main directions of further advance in the power of large computer systems is through exploitation of parallelism. Attempts to achieve parallelism in array processors, associative processors and vector or pipeline machines have succeeded only with the sacrifice of programmability. These large parallel machines all require that high levels of local parallelism be expressed in program formats that retain the notion of sequential control flow. Since most algorithms do not naturally exhibit local parallelism in the form expected by these machines, intricate data representations and convoluted algorithms must be designed if the potential of the machine is to be approached.

The alternative is to design machines that can exploit the global parallelism in programs, that is, to take advantage of opportunities to execute unrelated parts of a program concurrently. Conventional sequential machine languages are unsuited to this end because identification of concurrently executable program parts is a task of great difficulty. Data flow program representations are of more interest, for only essential sequencing relationships among computational events are indicated. An instruction in a data flow program is enabled for execution by the arrival of its operand values — there is no separate notion of control flow, and where there is no data dependence between program parts, the parts are implicitly available for parallel execution.

Several designs for data processing systems have been developed that can achieve highly parallel operation by exploiting the global concurrency of programs represented in data flow form [1-6]. Two of these designs [3, 6] are able to execute programs expressed in a conventional high-level language that exceeds Algol 60 in generality. These systems consist of units that operate independently and interact only by transmitting information packets over channels that connect pairs of units. The units themselves may have a similar structure that we call packet communication architecture.

Details of the above designated references are given below.

List of References

1. Dennis, J. B., and D. P. Misunas, "A computer architecture for higher parallel signal processing, "*Proceedings of the ACM 1974 National Conference*, ACM, New York, (November, 1974), 402-409.

2. Dennis, J. B., and D. P. Misunas, "A preliminary architecture for a basic data-flow processor, "*Proceedings of the Second Annual Symposium on Computer Architecture*, IEEE, New York (January 1975), 126-132.

3. Misunas, D. P. *A Computer Architecture for Data-Flow Computation.* SM Thesis, Department of Electrical Engineering and Computer Science, M.I.T., Cambridge, MA (June 1975).

4. Misunas, D. P., "Structure processing in a data-flow computer," *Proceedings of the 1975 Sagamore Computer Conference on Parallel Processing,* IEEE, New York (August 1975)

5. *Project MAC Progress Report XI,* Project MAC, M.I.T. (July 1973-1974), pp. 84-90.

6. Rumbaugh, J. E., *A Parallel Asynchronous Computer Architecture for Data Flow Programs,* Project MAC, M.I.T., Cambridge, MA, Report TR-150 (May 1975).

The disclosures of the foregoing references are incorporated into the present application by reference. The disclosures of aforementioned related U.S. Pat. No. 3,962,706 and related application Ser. No. 605,932 are incorporated into the present application by reference.

SUMMARY

The primary object of the present invention is to provide a memory system for a digital data processor, which memory system is characterized by: an input network for signals representing command packets and store packets; an output network for signals representing retrieval packets; a plurality of sub-memory systems for holding a plurality of records of data structure items; a distribution network for transmitting signals representing the command and store packets from the input network to sub-memory systems containing records corresponding to components of the command packets and the store packets; and an arbitration network for transmitting signals representing the retrieval packets to the output network. The memory of the present invention utilizes signals and records representing unique identifiers and reference counts, by which their storage and transmission is controlled.

Other objects of the present invention will in part be obvious and will in part appear hereinafter.

The invention accordingly comprises the system, its components and their interrelationships, of the present disclosure, the scope of which will be indicated in the appended claims.

BRIEF DESCRIPTION OF THE DRAWINGS

For a fuller understanding of the nature and objects of the present invention, reference is made to the following detailed description, which is to be taken in connection with the accompanying drawings, wherein:

FIG. 1 is a general schematic of a system embodying the present invention;

FIG. 2 is a diagram of a computer system illustrating certain background principles underlying the present invention;

FIG. 3 is a diagram of a memory system and its parts illustrating certain background principles underlying the present invention;

FIG. 4 is a diagram of the structure of a memory system for specification of its transactions;

FIG. 5 illustrates symbols representing a store transaction in accordance with the present invention;

FIG. 6 illustrates symbols representing a retrieval transaction in accordance with the present invention;

FIG. 7 illustrates symbols representing reference generation and anihilation in accordance with the present invention; and FIG. 8 illustrates symbols representing unique identifier generation in accordance with the present invention.

DETAILED DESCRIPTION

Generally, the embodiment of FIG. 1 is a memory system having the following structure for incorporation into a digital data processor. Command signals representing command packets of information and store packets of information, respectively, enter into the memory system through a command input network 20 and a store input network 22. Retrieval signals representing retrieval packets of information and unid (unique identifier) signals representing unid packets of information, respectively, exit from the memory system through a retrieval output network 24 and a unid output network 26. Retrieval command signals representing retrieval command packets of information are applied by a retrieval command output network 28 to command input network 20, where they merge with the command signals. Records representing components of items of information are held by a plurality of sub-memory systems 30. A command distribution network 32 applies command signals from command input network 20 to selected sub-memory systems 30 to control storage and retrieval. A store distribution network 34 applies store signals from store input network 22 to selected sub-memory systems 12 in order to establish components of the records. A retrieval arbitration network 36 applies retrieval signals to retrieval output network 24 in response to components of the records. A unid arbitration network 38 applies unid signals to unid output network 26. And a retrieval command arbitration network 40 applies retrieval command signals to retrieval command output network 28 in response to components of the records.

Structural details of command input network 20, store input network 22, retrieval arbitration network 36, unid arbitration network 38, and retrieval command arbitration network 40 are shown in the accompanying drawings and are described below and are substantially the same as details of the arbitration network of aforementioned U.S. Pat. No. 3,962,706 in FIGS. 35,36,37, and 38 and at column 14, line 46 to column 16, line 12. Structural details of retrieval output network 24, unid output network 26, retrieval command output network 28, command distribution network 32, and store distribution network 34 are shown in the accompanying drawings and are described below and are substantially the same as details of the distribution network of aforementioned U.S. Pat. No. 3,962,706 in FIGS. 39,40,41, and 42 and at column 16, line 13 to column 17, line 17. Structural details of sub-memory system 30 are shown in the accompanying drawings and are described below.

Details of the components of the foregoing memory system are described below following a discussion of background considerations to facilitate understanding. In the following discussion, for convenience information packets are said to be transmitted and stored although it is to be understood of course that in reality, signals and records representing such packets really are being described.

The Packet Communication Principle

Suppose the data processing part P of the computer in FIG. 2 is organized so that many independent computational activities may be carried forward concurrently —as would be true if P contains many independent sequential processors, or if P is designed to exploit the inherent parallelism of data flow programs. Activities in P will generate many independent requests to the memory system M for storage or retrieval of information. It is not essential that M respond immediately to these requests because, if P is properly organized, its resources (registers, instruction decoders, functional units) may be applied to other activities while some activities are held up by pending memory transactions. Thus the memory system need not be designed to complete one transaction before beginning the processing of other transactions. The present invention exploits this freedom by providing memory systems organized to process many transactions concurrently and to keep their constituent units heavily utilized.

Packet Communication Memory Systems

As an example of packet communication architecture, consider the memory system shown in FIG. 3 which is connected to a processing system P by four channels. Command packets sent to the memory system at port cmd are requests for memory transactions, and specify the kind of transaction to be performed. Items to be stored are presented as Store Packets at port store, and items retrieved from storage are delivered as Retrieval Packets at port rtr. The role of port unid will be explained later.

For further discussion of the operation of this memory system, we must define the desired behavior - the nature of the information stored, and how the contents of Retrieval Packets depends on the contents of Store Packets previously sent to the memory system. A precise specification of behavior may take the form of an abstract memory model consisting of a domain of values and a specification of each transaction in terms of the sequences of packets passing the ports of the memory system. We give an informal outline of such a memory model.

For simplicity, the value domain V is $$V = E + [V \times V]$$

and is the union of pairs consisting of all ordered pairs of elements of V. This domain is recursively defined, and consists of all finite binary trees having elementary values at their leaves.

Our memory model must deal with the retention of information by the memory system. We use a domain of abstract memory states which are acyclic directed graphs called state graphs. Each node of a state graph represents a value (binary tree) in V in the obvious way.

The transactions of this memory model are so specified that no outgoing arc is added or deleted from a node already present in the state graph, and hence the value represented by a node never changes. A memory system having this property is attractive for applicative languages such as pure Lisp and various determinate data flow languages.

The basis of a memory state is a subset of the nodes of a state graph that includes every root node of the graph (Thus each node and arc of a state graph is accessible over a directed path from some basis node). Each basis node represents a value in terms of which the processing system may request transactions by the memory system.

Each node of a state graph has an associated reference count which is the sum of two numbers —the number of state graph arcs that terminate on the node, and the number of "references" to the node (if it is a basis node) held in the processing system P. Each node of a valid state graph must have a reference count greater than zero.

We regard the memory system as holding a collection of items that represent a state graph in the manner of a linked list structure. To this end we require a set of unique identifiers for the nodes of state graphs. One may regard each unique identifier as corresponding to a unique site in the memory system that can hold a distinct item. The items held by the memory system are of two kinds:

1. Elementary items: (elem, i, e, r)
where
   i is a unique identifier
   e is an elementary value
   r is a reference count
2. Pair Items: (pair, i, j, k, r)
where
   i, j, k are unique identifiers
   r is a reference count Elementary items and pair items correspond to leaf modes and pair nodes, respectively, of a state graph. In each item, i is the unique identifier of the item.

For the purpose of specifying the transactions of the memory system, it is convenient to suppose that it has the structure shown in FIG. 4. Command packets delivered at port rc (for reference count) of M are merged with command packets from P and presented to M at port cmd. We specify the behavior of the whole memory system by specifying the behavior of M. We regard the state of M as consisting of a collection of items and a collection of unique identifiers not in use. In the initial state of M the collection of items is empty and every unique identifier is not in use.

The specifications for the behaviour of M state the response, if any, and change of state, if any, that accompany each kind of transaction. In the simple memory system we are considering, there are five kinds of transactions —four of these are associated with acceptance of command packets by M, and the fifth is associated with delivery of Unid Packets. The behaviour of M for a store transaction is depicted in FIG. 5. In response to a store command packet, the item presented at port store is added to the collection of items held by M, with unique identifier i, and is given an initial reference count of one.

A retrieval transaction is depicted in FIG. 6. The item delivered at port rtr is the item with unique identifier i in the collection of items held by M. The state of M does not change.

Reference generation and anihilation are depicted in FIG. 7. The up command adds one to the reference count of item i; the down command decrements its reference count by one. If the reference count is reduced to zero by a down command, the item is deleted from the collection of items held by M and its unique identifier i is added to the collection of unused unique identifiers. Case (c) applies if the item deleted is a pair item since the reference counts of its component items must be decremented.

Unique identifier generation is depicted in FIG. 8. Some unique identifier is removed from the set of unused unique identifiers and delivered at port unid.

We have not specified the behavior of M under certain conditions that should not occur during normal operation —for example, if a store Command Packet contains a unique identifier which is already the unique identifier on an item held by M. We assume the processing system is so designed that such ill behavior cannot occur.

Operation of the Memory System Structure of FIG. 1

With the foregoing informal specification of M, we are prepared to see how M is implemented in the embodiment of the invention illustrated in FIG. 1.

First we show how concurrent processing of many transactions can be achieved by distributing Command Packets among many identical physical modules which can operate independently. Such a structure for M is shown in FIG. 1. Each Command Packet and each Store Packet is distributed to one of the memory subsystems $M_1 \ldots M_r$ according to some easily tested property of i, the unique identifier of the item to which the packet refers. The property might be the first p bits of the binary representation of the unique identifier where $r = 2^p$.

The subsystems $M_1, \ldots M_r$ are memory systems having specifications identical to the specification of M except that the universe of unique identifiers for the items held by each subsystem is restricted to $(1/2)^p$ of the unique identifiers of M. This fact may be used to reduce the complexity of the memory subsystems.

The Retrieval Packets, Command Packets, and Unit Packets delivered by the memory subsystems at their rtr, rc, and unid ports are merged into common streams by three Arbitration Networks. Note that the Command Packets from subsystem rc ports must be recirculated through the Distribution Networks because, in general, the items they refer to will be held in subsystems other than the sybsystem from which they originate.

Structural details of command input network 20 and store input network 22 are substantially the same as details of the arbitration network described in FIGS. 35,36,37, and 38 and at column 14, line 46 to column 16, line 12 of U.S. Pat. No. 3,962,706, with the exception that the Function Switch modules and the Serial/Parallel Converter and Buffer modules shown in FIG. 35 of U.S. Pat. No. 3,962,706 are not required in the command input network 20 and the store input network 22 since there is no switching performed in these networks. Rather, a number of input links to each network are merged through use of the arbitration units detailed in FIGS. 35 and 36 of U.S. Pat. No. 3,962,706 to a number of output links equal to the number of input links of command distribution network 32 and store distribution network 34, respectively.

Structural details of command distribution network 32 and store distribution newtork 34 are substantially the same as details of the distribution network shown in FIGS. 39,40,41, and 42 and at column 16, line 13 to column 17, line 17 of U.S. Pat. No. 3,962,706. These separate and independent networks each merge the packets received at their input ports and sort the packets by the unique identifier contained in each packet, distributing the packets to one input port of one of the plurality of sub-memory units 30, where the target sub-memory unit is designated by the unique identifier used for sorting the packets.

Structural details of retrieval arbitration network 36, unid arbitration network 38, and retrieval command arbitration network 40 are substantially the same as details of the arbitration network described in FIGS. 35,36,37, and 38 and at column 14, line 46 to column 16, line 12 of U.S. Pat. No. 3,962,706, with the exception that the Function Switch modules shown in FIG. 35 of U.S. Pat. No. 3,962,706 are not required. These three networks are separate and independent networks, each of which accepts packets from one output port each of a plurality of sub-memory units 30 and merges the received packets into a single stream of packets presented at the output port of each network.

Structural details of retrieval output network 24, unid output network 26, and retrieval command output network 28 are substantially the same as those of the distribution network described in FIGS. 39,40,41, and 42 and at column 16, line 13 to column 17, line 17 of U.S. Pat. No. 3,962,706. These networks serve to transfer packets from the output ports of the retrieval arbitration network 36, the unid arbitration network 38, and the retrieval command arbitration network 40, respectively, to the input ports of the system to which the memory system is connected and to return command packets generated by operation of the memory system to the input of the memory system for further processing.

Details of sub-memory system 30 are described above in terms of the response of the memory system to legal transactions on the memory system, and structural details of the memory system are readily apparent from these transactions depicted in FIGS. 5,6,7, and 8. Such transactions are readily implemented in digital logic in the following fashion: Items are maintained in a data memory composed of random-access memory chips, and the unique identifier of each item consists of its address in the data memory. Store and retrieval transactions merely cause write and read operations to be performed on the random-access memory chips comprising the data memory. A separate control memory composed of random-access memory chips maintains a reference count associated with each location of the data memory and a list of free locations in the data memory. The reference counts held in the control memory are incremented and decremented in response to up and down commands through an arithmetic circuit connected to the random-access memory chips of the control memory. Comparison circuitry on the output of the arithmetic circuitry continually checks the resulting reference counts to see if they are equal to zero. If so, the address in the data memory of the item with which the reference count which has become zero is associated is written into the list of free unique identifiers. The list of free unique identifiers is initially a list of all addresses in the data memory, and the free unique identifiers are presented one-at-a-time at the unid output of the sub-memory unit. An alternate implementation of sub-memory unit 30 could utilize a conventional digital processor with enough random-access memory to hold the data, reference counts, and free unique identifier list with the transaction described in FIGS. 5,6,7, and 8 implemented in software on the processor.

Since certain changes may be made in the present disclosure, it is intended that all matter described in the foregoing specification and shown in the annexed drawings be interpreted in an illustrative and not in a limiting sense.

What is claimed is:

1. A memory system for a digital data processor, said memory system comprising:
   (a) input network means for merging signals representing components of command packets and store packets, said signals representing components of command packets and store packets consisting of signals representing transactions to be performed by said memory system;
   (b) output network means for distributing signals representing components of retrieval packets, said signals representing components of retrieval packets consisting of signals representing the results of transactions specified in said signals representing components of command packets on said memory system;
   (c) a plurality of sub-memory system means for holding a plurality of records representing certain of said components, said records designated by unique identifiers;
   (d) distribution network means for transmitting signals representing components of said command packets and of said store packets from said input network means to members of said sub-memory system means in correspondence with the signals representing components of said command packets and said store packets, said signals representing components of said command packets and said store packets containing signals representing said unique identifiers associated with said records contained in said sub-memory system means;
   (e) arbitration network means for transmitting signals representing components of said retrieval packets from said sub-memory system means to said output network means;
   (f) said signals representing components of store packets specifying data items sent to said memory system by some external device to be stored in said sub-memory system means and associated with one of said unique identifiers;
   (g) said signals representing components of retrieval packets specifying data items retrieved from said sub-memory system means and sent to some external device;
   (h) said signals representing components of command packets specifying whether a store operation or retrieval operation is to be performed on said records in order to generate and control said signals representing components of said store packets and said signals representing components of said retrieval packets, said store operation representing the storage of a data item in said memory system and said retrieval operation representing the retrieval of a previously stored data item from said memory system; and (i) each of said sub-memory system means consisting of storage means for storing data in response to signals received from said distribution network means and representing command packets specifying store operations and signals received from said distribution network means and representing store packets containing data items, retrieval means for retrieving data items from said sub-memory system means in response to signals received from said distribution network means and representing command packets specifying retrieval operations, said data items retrieved from said sub-memory system means transmitted as signals representing retrieval packets to said arbitration network means.

2. The memory system of claim 1 wherein said distribution network means includes a command distribution means for transmitting said signals representing said components of said command packets to said plurality of sub-memory system means and store distribution means for transmitting said signals representing said components of said store packets to said plurality of sub-memory system means.

3. The memory system of claim 1 wherein said arbitration network means consists of a retrieval arbitration network means for transmitting said signals representing said components of said retrieval packets from said plurality of sub-memory system means.

4. A memory system for a digital data processor, said memory system comprising:

(a) input network means for merging signals representing components of command packets and store packets, said signals representing components of command packets and store packets consisting of signals representing transactions to be performed by said memory system;

(b) output network means for distributing signals representing components of retrieval packets, said signals representing compounds of retrieval packets consisting of signals representing the results of transactions specified in said signals representing components of command packets on said memory systems;

(c) a plurality of sub-memory system means for holding a plurality of records representing certain of said components, said records designated by unique identifiers;

(d) distribution network means for transmitting signals representing components of said command packets and of said store packets from said input network means to members of said sub-memory system means in correspondence with the signals representing components of said command packets and said store packets, said signals representing components of said command packets and said store packets containing signals representing said unique identifiers associated with said records contained in said sub-memory system means;

(e) arbitration network means for transmitting signals representing components of said retrieval packets from said sub-memory system means to said output network means;

(f) said signals representing components of store packets specifying data items sent to said memory system by some external device to be stored in said sub-memory system means and associated with one of one of said unique identifiers;

(g) said signals representing components of retrieval packets specifying data items retrieved from said sub-memory system means and sent to some external device;

(h) said signals representing components of command packets specifying whether a store operation or retrieval operation is to be performed on said records in order to generate and control said signals representing components of said store packets and said signals representing components of said retrieval packets, said store operation representing the storage of a data item in said memory system and said retrieval operation representing the retrieval of a previously stored data item from said memory system;

(i) said distribution network means including a command distribution means for transmitting said signals representing said components of said command packets to said plurality of sub-memory system means and store distribution means for transmitting said signals representing said components of said store packets to said plurality of sub-memory system means;

(j) said arbitration network means including a retrieval arbitration network means for transmitting said signals representing said components of said retrieval packets from said plurality of sub-memory sytem means, a retrieval command network means for transmitting signals representing components of retrieval command packets from said plurality of sub-memory system means to said distribution network means, said signals representing components of retrieval command packets consisting of signals representing reference count transaction commands and associated signals representing said unique identifiers, and a unid arbitration network means for transmitting signals representing components of unid packets from said plurality of sub-memory system means, said signals representing components of unid packets consisting of signals representing said unique identifiers;

(k) each of said plurality of sub-memory system means containing a plurality of memory cells, certain of said plurality of memory cells being occupied by components of records and others of said plurality of memory cells being unoccupied by components of records, said plurality of memory cells holding said records representing said components designated by said unique identifiers; and (l) each of said sub-memory system means consisting of storage means for storing data in response to signals received from said distribution network means and representing command packets specifying store operations and signals received from said distribution network means and representing store packets containing data items, retrieval means for retrieving data items from said sub-memory system means in response to signals received from said distribution network means and representing command packets specifying retrieval operations, said data items retrieved from said sub-memory system means transmitted as signals representing retrieval packets to said arbitration network means, reference count means for maintaining an integer value associated with each of said unique identifiers associated with one of said records contained in said sub-memory system means and altering said integer value in response to said signals representing components of said command packets and said signals representing components of said retrieval command packets, and unid means for maintaining a list of free unique identifiers and transmitting said free unique identifiers to said distribution means as signals representing components of said unid packets.

5. The memory system of claim 4 wherein said signals representing components of unid packets are in correspondence with unoccupied memory cells.

6. The memory system of claim 4 wherein said signals representing components of store packets and said signals representing components of command packets contain said unique identifiers obtained from said signals representing unid packets, receipt of signals representing components of a store packet containing one of said unique identifiers and a data item and signals representing components of a command packet specifying a store operation and containing the same unique identifier results in memory cells corresponding to said unique identifier being changed from unoccupied to occupied, and said data item being stored in said memory cells.

7. The memory system of claim 4 wherein receipt of signals representing components of command packets containing unique identifiers and specifying retrieval operations causes transmission of signals representing retrieval packets containing like unique identifiers and related data items held by their associated memory cells.

8. The memory system of claim 4 wherein receipt of signals representing command packets specifying an up operation and containing unique identifiers causes components of records representing reference counts maintained by said reference count means of corresponding memory cells to be incremented by the integer 1, the receipt of signals representing command packets specifying a down operation and containing unique identifiers causes components of records representing reference counts maintained by said reference count means of corresponding memory cels to be decremented by the integer 1, whereby components of records of memory cells representing reference counts that become 0 correspond to memory cells that become unoccupied and unique identifiers of signals that represent unid packets.

9. The memory sytem of claim 4 wherein components of records held by memory cells represent unique identifiers, and when components of records representing reference counts represent a reference count of 0, each memory cell transmitting signals representing one down command packet for each unique identifier associated with its component of record.

* * * * *